United States Patent [19]

DiNapoli et al.

[11] Patent Number: 5,357,511
[45] Date of Patent: Oct. 18, 1994

[54] DISTRIBUTED PROCESSING IN A DIGITAL AUDIO MIXING NETWORK

[75] Inventors: Jeffrey M. DiNapoli, Louisville; John L. Melanson, Boulder, both of Colo.

[73] Assignee: Peak Audio, Inc., Boulder, Colo.

[21] Appl. No.: 34,022

[22] Filed: Mar. 22, 1993

[51] Int. Cl.$^5$ .......................... H04J 3/02; H04M 3/56
[52] U.S. Cl. .................................. 370/62; 370/85.11; 379/158; 379/206; 381/77
[58] Field of Search .............. 370/29, 62, 67, 85.1, 370/85.11, 79; 379/158, 202, 206; 381/77, 80

[56] References Cited

U.S. PATENT DOCUMENTS

| | | | |
|---|---|---|---|
| 4,224,688 | 9/1980 | Ciancibello et al. | 370/62 |
| 4,271,502 | 6/1981 | Goutmann et al. | 370/62 |
| 4,575,845 | 3/1986 | Baranyai et al. | 370/62 |
| 4,646,288 | 2/1987 | Shumway | 370/62 |
| 4,797,877 | 1/1989 | Pope et al. | 370/62 |
| 5,207,347 | 6/1991 | Malkki | 370/62 |

*Primary Examiner*—Douglas W. Olms
*Assistant Examiner*—Russell W. Blum
*Attorney, Agent, or Firm*—Homer L. Knearl

[57] ABSTRACT

A large mixing network is implemented by distributing the processing of digital audio data to multiple digital processing modules where each module has multiple digital signal processors. The data is multiplexed from all audio stations to all distributed processing modules. The task of transferring audio data between audio bus and distributed processing module (DPM) and the task of processing audio data at the DPM are performed in parallel. Further, the data is multiplexed in large bursts of samples to increase the efficiency of audio data processing by the digital signal processors at the DPM.

17 Claims, 5 Drawing Sheets

DISTRIBUTED PROCESSING IN A DIGITAL AUDIO MIXING NETWORK

BACKGROUND OF THE INVENTION

1. Field of the Invention

This invention is directed to a method and apparatus for duplex communication in very large mixing networks or intercoms. More particularly, the invention is directed to distributed processing of audio data between multiple audio stations in a large mixing network.

2. Description of Prior Art

Central, conference controllers in telephone networks are well known. In these networks, each telephone is connected to a central processing station. The processor at that central phone station receives the audio signals to be combined in a conference connection, mixes the signals and sends the mixed audio signal to the telephones in the conference connection. Some examples of conference controllers using a central processing station are U.S. Pat. Nos. 4,224,688, 4,271,502 and 5,027,347.

In addition, U.S. Pat. No. 4,646,288 entitled, "Multi-Line Accumulator/Multiplexer" and issued to J. L. Shumway shows an example of a digital implementation of a multiplexer that could be used at a central control station for conferencing. Shumway sums digital audio from time division multiplex channels in an accumulator. He uses a buffer that toggles between being connected to the TDM bus and the accumulator. The accumulated audio signal is then sent out. The accumulator/multiplexer is a one-way system so the central station requires two such devices for duplex operations.

U.S. Pat. No. 4,575,845, entitled "Time Division Multiplex Conferencer" and issued to L. Baranyai et al, describes a one-way digital audio mixing system for a central station. Baranyai et al performs the same task as Shumway, but Baranyai has no storage of digital audio data prior to the summer or accumulator. Accordingly, there is only one opportunity per TDM time frame to sum time slots in the frame into mixed, or conference, audio data. Since the flow is one way through the device, two such devices are required at the central station for duplex conferencing.

All of the prior art devices are performance limited by their use of central digital circuits for conferencing the digital audio signals. In addition, they are directed to conferencing rather than mixing. In conferencing, all audio signals would have the same gain, while in mixing, each audio signal would have separate selectable gain. Accordingly, the conference network prior art is not designed to handle mixing, and could not handle a large mixing network without quickly loading down the central processor and running out of processing power.

SUMMARY OF THE INVENTION

It is an object of this invention to increase the performance of communication mixing networks so as to be able to accommodate many audio stations simultaneously.

In accordance with this invention, the above object is accomplished by distributing the processing of the audio data to multiple digital processing modules where each module has multiple digital signal processors. The data is multiplexed from all audio stations to all processing modules on a bidirectional audio bus. The task of transferring audio data between audio bus and Distributed Processing Module (DPM) and the task of processing audio data at the DPM are performed in parallel. Also, the input processing of audio data from an audio station, the mixing of audio data from multiple stations and the output processing of mixed audio data for an audio station is distributed among the DPMs. Further, the data is multiplexed in large bursts of samples to increase the efficiency of audio data processing by the distributed processors.

Other objects, advantages and features of the invention will be understood by those of ordinary skill in the art after referring to the complete written description of the preferred embodiments in conjunction with the following drawings.

DESCRIPTION OF THE PREFERRED EMBODIMENTS

Figure 1:
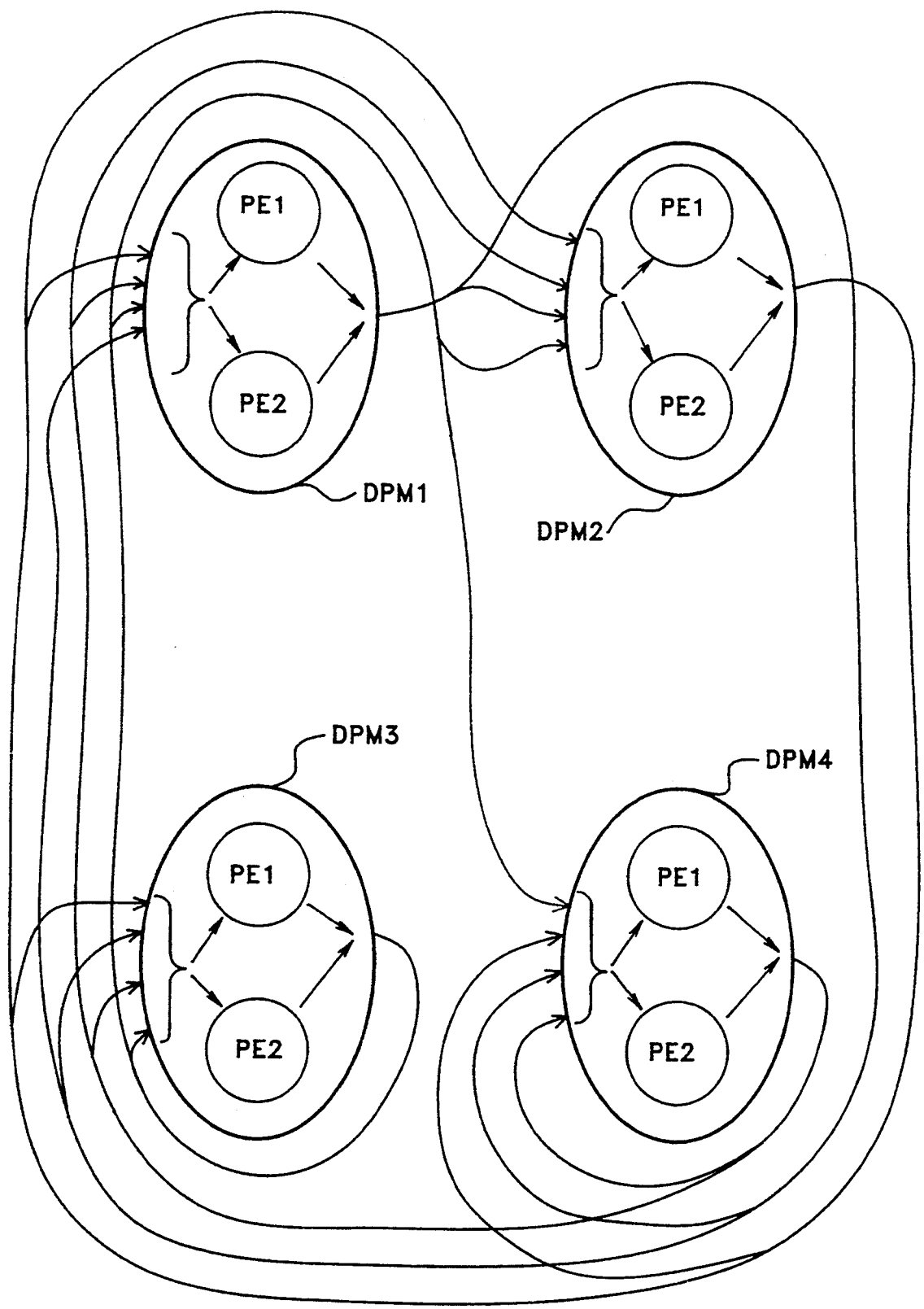
FIG. 1 is a data flow diagram illustrating the dual distributed levels for digital processing of the audio data to accomplish mixing.

In the data flow diagram of FIG. 1, the multiple level distributed processing concept of the invention is illustrated. In the preferred embodiment of FIG. 1, there are four distributed processing modules DPM1, DPM2, DPM3 and DPM4. Each of the DPMs has multiple processing elements (digital signal processors); two processing elements PE1 and PE2 are shown in each DPM in FIG. 1. Each PE can support multiple audio stations (not shown). For example, if each processing element has four audio stations connected to it, the conference network in FIG. 1 would handle mixing among thirty two audio stations, with the audio data processing being distributed over eight processing elements in four DPMs. Of course, there could be four, eight or any number of stations per processing elements, any number of processing elements per DPM and any number of DPMs. Anyone skilled in the art will appreciate from FIG. 1 that the number of stations that can be handled in this distributed processing conference system can be expanded greatly as the result of multiplying the stations per PE by PEs per DPM by DPMs. For example, if there are four stations per PE, four PEs per DPM, and sixteen DPMs, the system will provide mixing for two hundred fifty six audio stations.

FIG. 1 also illustrates the flow of data from all DPMs, and thus all PEs, to all DPMs and all PEs on the bidirectional bus. No one DPM or PE is processing the data flow. All DPMs and PEs are sharing all the time division multiplexed data on the bidirectional bus. The processing of audio data from one station to another audio station may be performed by multiple processing elements. For example, the audio data from an audio station attached to PE1 is processed by PE1 in DPM2, flows to PE2 in DPM4 for mixing, and the mixed audio data flows from DPM4 to PE1 at DPM1 for output processing for an audio station attached to PE1 of DPM1.

Figure 2:
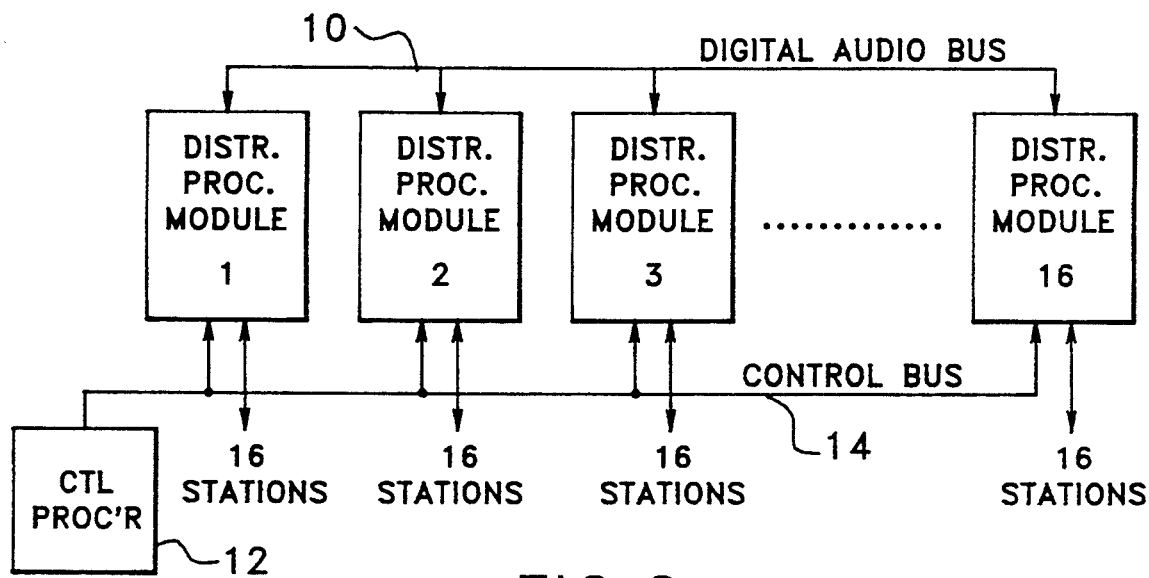
FIG. 2 shows the preferred embodiment of the mixing system.

FIG. 2 shows another preferred embodiment of the system implementing a two hundred fifty six audio station mixing system. Sixteen distributed processing modules, DPM1 through DPM16, are connected together on a Time Division Multiplex (TDM) Digital Audio Bus (DAB) 10. Each DPM supports sixteen audio stations where each station has at least one sound source, such as a microphone, and at least one audio speaker for reproducing sound. Each DPM contains four audio digital signal processors (DSPs), and each DSP supports four audio stations. The DPM will be described hereinafter in reference to FIG. 3.

Control processor 12 initializes and otherwise provides control information to each DPM and each DSP over control bus 14. Processor 12 in the preferred embodiment is a personal computer and the control bus is a PC bus. Each of the DPMs is a circuit card connected to the PC bus; i.e., control bus 14. The digital audio bus 10 is an additional bus connected only between the DPM cards.

Figure 3:
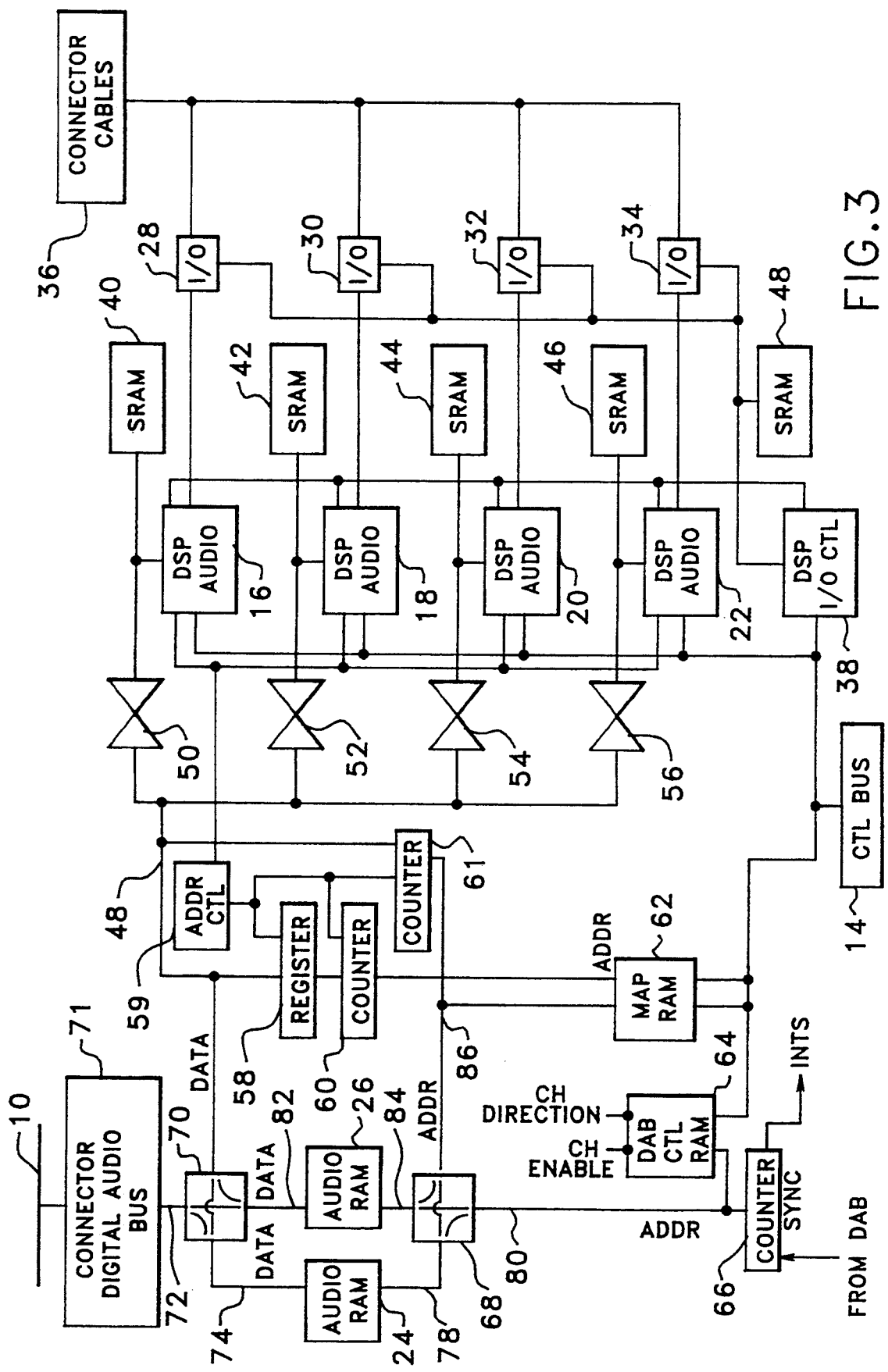
FIG. 3 is a schematic block diagram of each distributed processing module shown in FIG. 2.

In the preferred embodiment for the DPM cards, shown in FIG. 3, the audio DSPs 16, 18, 20 and 22 retrieve audio data from, or supply audio data to, audio RAM 24 or audio RAM 26. The audio DSPs 16, 18, 20 and 22 also receive audio data from, or supply audio data to, their audio stations connected through I/O adapters 28, 30, 32 and 34, respectively. Each I/O adapter is connected to four audio stations through connector cables 36. Thus, each audio DSP supports four audio stations and the DPM card illustrated as FIG. 3 supports sixteen audio stations.

The I/O adapters and the connector cables conform to formats and protocols established by AES (Audio Engineering Society). DSP 38 functions as the I/O controller to control the I/O adapters in accordance with the AES protocols.

Each DSP contains a processor, ROM and RAM. Working storage for the DSP includes registers or RAM in the DSP, and additional SRAM (static RAM) storage devices. SRAMS 40, 42, 44 and 46 provide audio data storage for audio DSPs 16, 18, 20 and 22, respectively. SRAM 46 is additional memory used by I/O Control DSP 38.

A transceiver is provided between each audio DSP and the data bus 48. The transceivers must be bidirectional as data flows in both directions between the audio DSPs and the audio RAMs. Transceivers 50, 52, 54 and 56 connect audio DSPs 16, 18, 20 and 22, respectively, to audio bus 48, while providing electrical isolation between the audio DSPs.

The portion of the DPM to the left of transceivers in FIG. 3 may be viewed as audio data storage interface between the audio DSPs and the digital audio bus 10 as controlled by an address processor. The working storage for audio data in this interface is the audio RAMs 24 and 26. The address processor comprises register 58, address control 59 counters 60, 61, and map RAM 62. The address processor handles the addressing of audio RAMs 24 and 26 for the audio DSPs. The audio DSPs set up the address processor by loading address data to register 58 and counters 60 and 61. The audio DSPs control the incrementing of the address through address control 59. The address may be incremented in a column or row manner. DAB control RAM 64 and counter 66 provide address and operation control of the audio RAMs for transfers between the audio RAMs and DAB 10.

Block switch 68 controls the application of the address to audio RAMs 24 and 26; block switch 70 controls the transfer path for the flow of data into and out of audio RAMs 24 and 26. Switches 68 and 70 work in tandem to connect each audio RAM to DAB 10 through connector 71, or to connect each audio RAM to DSPs 16, 18, 20 and 22 through data bus 48. Connector 71 is an impedance match connection to the DAB 10 that passes the digital audio data to the DPM card.

As shown in FIG. 3, switches 68 and 70 have two positions. In a first position, they connect buses directly across the switch, and in a second position they connect adjacent buses. In position A, data bus 72 is connected to data bus 74, while address bus 80 is connected to address bus 78. At the same time, data bus 48 is connected to data bus 82, and address bus 84 is connected to address bus 86. Accordingly, in position A for the switches, digital audio data is being transferred between DAB 10 and audio RAM 24 under address control by counter 66, while digital audio data is being transferred between DSPs 16, 18, 20 and 22 and audio RAM 26 under address control by map RAM 62. In position B, data buses 72, 82 and data buses 48, 74 are connected while address buses 78, 86 and address buses 80, 84 are connected. Thus, in position B, audio data is transferred between DAB 10 and audio RAM 26, and between the audio DSPs and audio RAM 24 under address control, respectively, by counter 66 and map RAM 62.

This audio data storage interface under address processing control has two significant features. First, it results in optimum efficiency of both the audio RAMs and digital audio bus 10. In other words, there is no dead time either at the audio RAMs or on the bus. Both are constantly in use. Second, the processing speed between the one audio RAM and DAB 10 does not have to match the processing speed between the other audio RAM and the DSPs. In fact, the two digital audio processes (data transfer processing and audio processing) run asynchronously. The data transfer processing is synchronized to DAB 10, while the DSPs run at their own clock rate with the constraint that they must complete their audio processing before the switch period changes between positions A and B described above.

Operation of Distributed Processing Module

Figure 4:
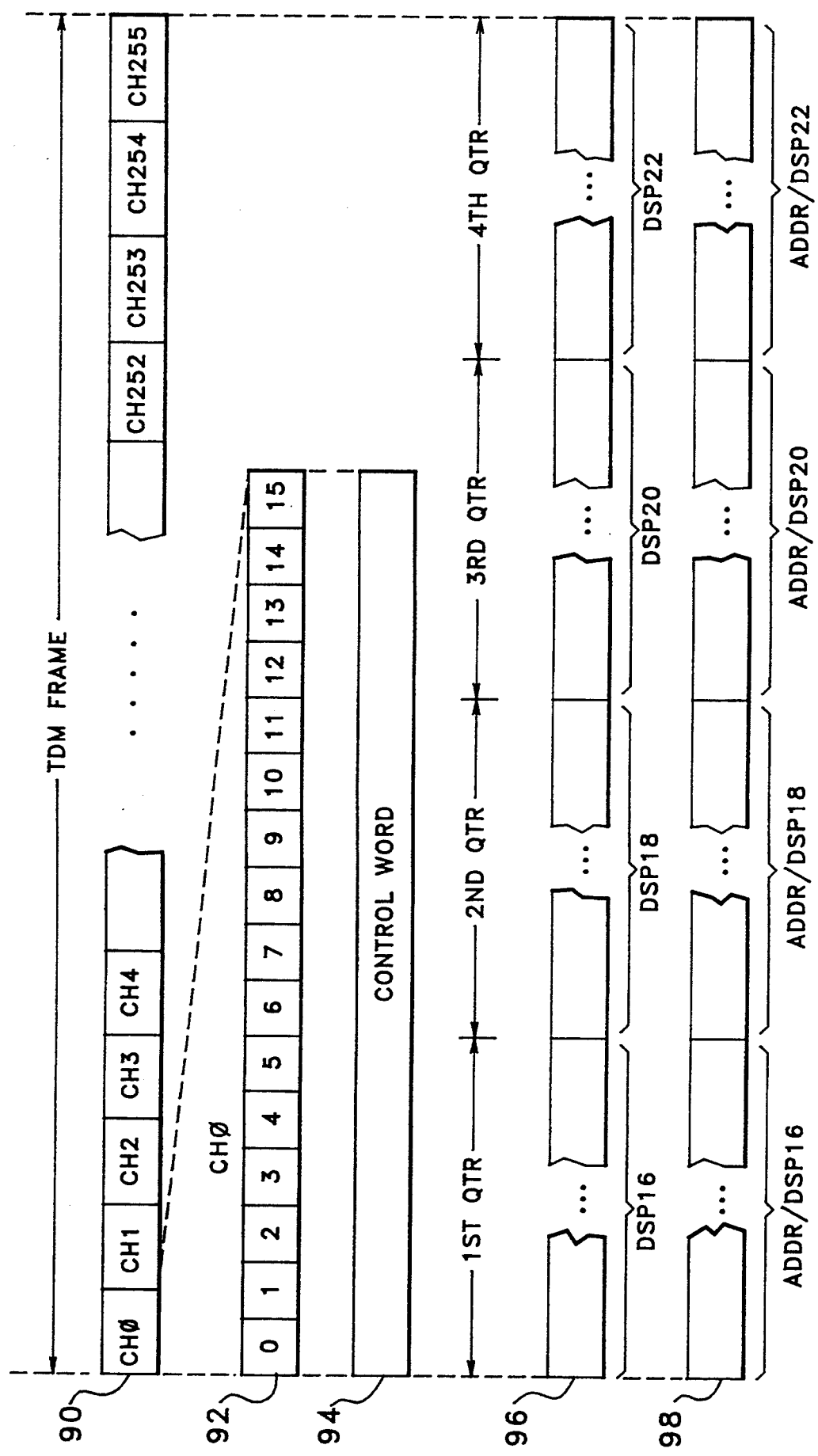
FIG. 4 is a timing diagram for the time division multiplexed audio channels as interfaced to the audio bus and to the audio digital signal processors in each distributed processing module.

To understand the operation or process flow of the DPM in FIG. 3, it is necessary first to understand the timing of the digital audio data samples and multiplexed digital audio data. FIG. 4 shows the timing of the digital audio data on the time division multiplexed DAB 10. In the preferred embodiment, there are 256 audio stations in the mixing system. Therefore, there are 256 time slots in one frame of TDM data as depicted in line 90 of FIG. 4. Accordingly, each time slot, 0 through 255 could contain one digital sample of audio signal for or from its associated audio station. However, in the preferred embodiment, each time slot contains sixteen samples (see line 92 of FIG. 4) of the audio signal associated with its audio station. This burst of digital sample data referred to herein as a "sample group" optimizes the efficiency of the DSPs as will be explained hereinafter. Line 92 in FIG. 4 is a sample group, i.e., sixteen digital samples of audio signal from audio station zero. Each of the time slots or channels contain a sample group of audio data for its associated audio station.

Line 94 in FIG. 4 shows the control word for a time slot or channel. The control word defines whether the channel is enabled, and what the direction of data flow is for that channel. For full mixing, all channels would always be enabled, but the control word does provide a mechanism for disabling or inhibiting each channel and thus each station. The direction of data flow defines whether during a time slot data is flowing from DAB 10 to an audio RAM or to DAB 10 from an audio RAM.

FIG. 4 also illustrates the timing of audio processing operations by the audio DSPs with an audio RAM. While one audio RAM is interfacing with DAB 10 in accordance with the timing in lines 90, 92 and 94 in FIG. 4, line 96 shows the access timing by the audio DSPs with the other audio RAM. During each access by an audio DSP, one sample group of data (sixteen samples for a given audio station) are transferred between the DSP and the audio RAM. Notice that the DSPs complete their access to the audio RAM before the period of the TDM frame on DAB 10 has expired. Line 98 in FIG. 4 indicates each address word created by map RAM 62 is coexistent with the timing of access to the audio RAM by each audio DSP.

Referring now to FIGS. 3 and 4, the operation of the DPM will be described. The DPM shown as FIG. 3 is initialized by the personal computer over control bus 14. During initialization, the DAB controls are loaded into DAB control RAM 64, the address map to be used by each audio DSP is loaded into map RAM 62, and programs for each audio DSP and the I/O Control DSP are loaded into RAM in the DSPs. Counter 66 provides timing for the DPM, and is synchronized to the other DPMs by a SYNC signal on DAB 10. The SYNC signal identifies the start of a time division multiplex (TDM) frame on DAB 10.

For the TDM frame depicted in FIG. 4, switches 68 and 70 are in position A. Accordingly, audio RAM 24 is connected to DAB 10, and audio RAM 26 is connected to the audio DSPs 16, 18, 20 and 22. Examining first the interaction of audio RAM 24 and DAB 10 (lines 90, 92 and 94 of FIG. 4), counter 66 (FIG. 3) provides a different address to RAM 24 during each of the 256 time slots in the TDM frame. Also, during each time slot, DAB control RAM 64 provides control signals to control whether the data transfer for each channel (time slot) is enabled and whether the transfer is to DAB 10 or from DAB 10. Thus, during a TDM frame each of the 256 channels is transferred between DAB 10 and audio RAM 24.

During the same TDM frame, the audio DSPs are interacting with audio RAM 26 (lines 96 and 98 of FIG. 4). Counter 66 (FIG. 3) provides an interrupt to each audio DSP to notify each DSP when during the TDM it has access to audio RAM 26. During the first quarter of the TDM frame DSP 16 has access. Audio DSP 16 generates an address data word for register 58 and counter 60. Register 58 and counter 60, along with map RAM 62, operate as an address mapper to convert the address data word from DSP 16 into an address for audio RAM 26. The address is used by audio RAM 26 to access a word in RAM 26 containing a sample group of audio data, sixteen digital samples, for an audio station supported by audio DSP 16. This sample group is processed by audio DSP 16 and transferred between audio RAM 26 and SRAM 40. The above addressing and transfer must be accomplished in less than one-fourth (since there are four audio DSPs) of the TDM frame.

An interrupt from counter 66, at the beginning of the second quarter of the TDM frame, terminates access by audio DSP 16 to audio RAM 26 and initiates access by audio DSP 18 to audio RAM 26. While Audio DSP 16 does not have access to audio RAM 26, it processes audio data and transfers the audio data between SRAM 40 and its associated four audio stations over I/O 28 and cables 36. The DSPs work with a sample group (16 samples) of data per station rather than one sample per station for optimum efficiency of the DSP. The processing of samples from each station requires certain parameters to be set. Once the parameters are set, it is more efficient to process a burst of samples for the same station.

Figure 5A:
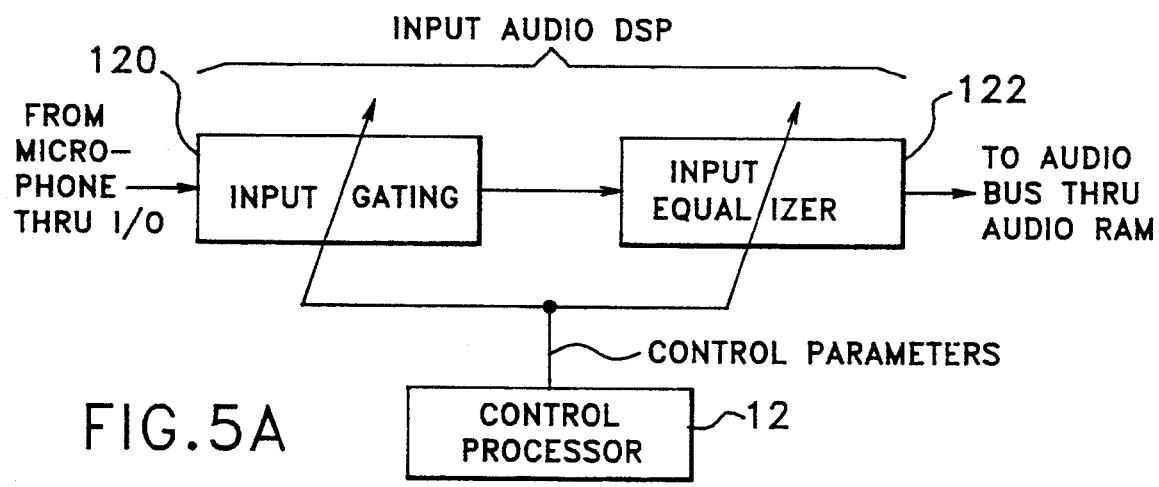
FIGS. 5A, 5B and 5C illustrate the distributed processing of audio data along the bidirectional audio bus as audio data is processed from input audio station to output audio station.
Figure 5B:
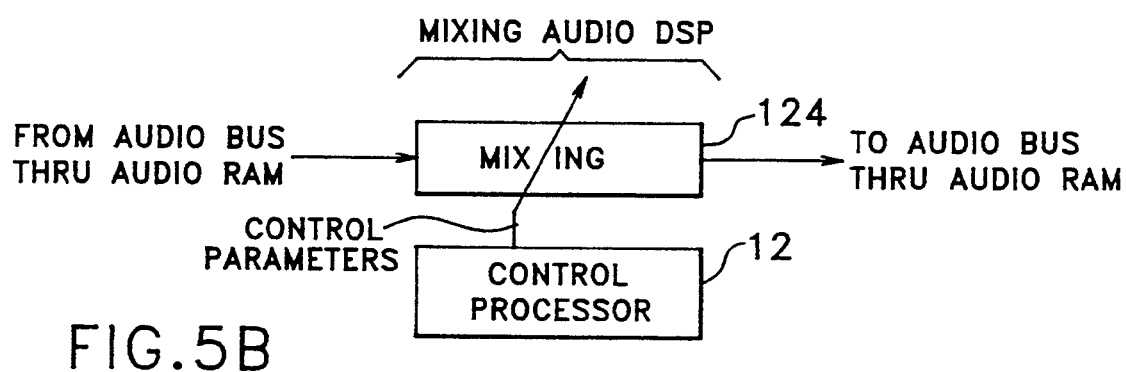
Figure 5C:
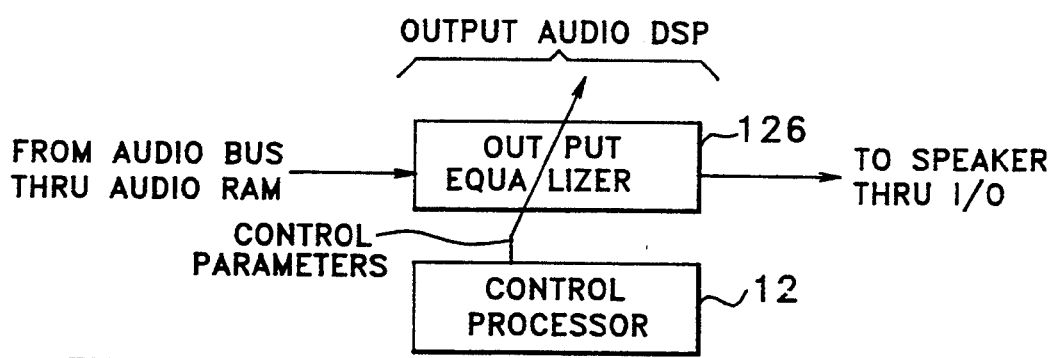

In FIGS. 5A, 5B and 5C, the distributed processing of audio data from an input microphone to an output speaker is illustrated. In FIG. 5A, an audio DSP is processing input audio data from a microphone in one the stations attached to its I/O. The input operations performed at this audio DSP include input gating 120 and input equalization 122. Input gating 120 selects whether the channel for that microphone is enabled, and selects a gain for that microphone's input to the channel. Input equalization 122 provides gain boost or reduction over low, mid-range and high frequencies for the input from the microphone. Both operations are performed by the audio DSP attached to the input station under control of the control processor 12. Control processor 12 has loaded the programs that the audio DSP is running, and has also provided the control parameters for the input gating and equalization operations. Input processed audio data is stored in the audio DSP's SRAM until the DSP has access to the audio RAM and, thus, the bidirectional audio bus 10.

In FIG. 5B, an audio DSP in a DPM attached to the bidirectional audio bus is performing the mixing operations 124 to combine the input audio data from FIG. 5A with input or mixed audio data from other stations. While the mixing audio DSP might be the same as the input audio DSP in FIG. 5A, it is very likely another audio DSP in another DPM on the bidirectional bus. In performing the mixing operation 124, the audio DSP pulls audio data from selected channels from an audio RAM and accumulates that data to create mixed audio data. The mixing operation may be viewed as a matrix multiplying operation where the gain factor for each audio input to each audio output is applied to the audio data for that input to be mixed in the channel for that output. The selection channels to be accumulated is controlled through the addressing processing by counters 60, 61 and map RAM 62. The mixed audio data is stored in the DSP's SRAM until the DSP again has access to the audio RAM and thus the audio bus. Control processor 12 has loaded the programs that the mixing audio DSP is running, and has also provided the control parameters for the mixing operation.

In FIG. 5C, an audio DSP attached to the output station for the mixed audio data performs the output equalization operation 126. The output equalization 126 provides gain boost or reduction over low, mid-range and high frequencies to compensate the output characteristics at the speaker in the output audio station. The operation is performed by the audio DSP attached to the output station under control of the control processor 12. Control processor 12 has loaded the programs that the audio DSP is running and has also provided the control parameters for the output equalization operation. The equalized mixed audio data is stored at the audio DSP's SRAM until the DSP has access to the audio RAM and thus the audio bus 10.

Each of the audio DSPs operates, as just described, for audio DSP 16 and the DSPs in FIGS. 5A, 5B and 5C. In the one quarter of the TDM frame that an audio DSP has access to an audio RAM it is transferring input processed audio data to the audio bus, it is receiving from the audio bus, mixing audio data and sending to the audio bus, or it is receiving mixed audio data from the audio bus. In the next three quarters of TDM frame, when an audio DSP does not have access to the audio bus through an audio RAM, the audio DSP is performing the input gating, input equalization, and output equalization operations. Of course, if the mixing operation is not completed during access to an audio RAM, the mixing operation can also be performed during the three quarter TDM frame time interval when there is no access to the audio bus through the audio RAM.

Figure 6:
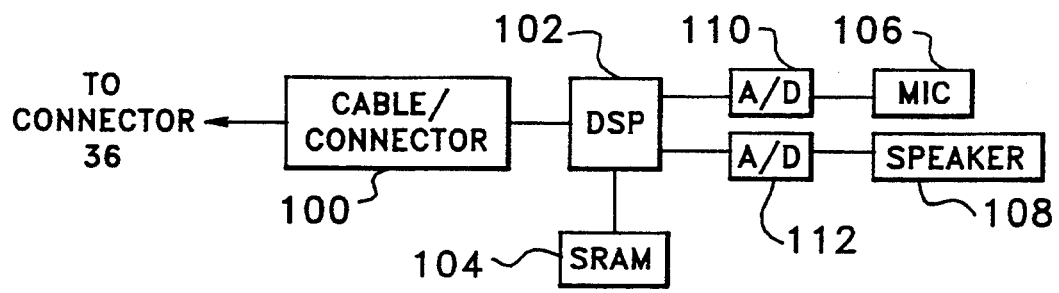
FIG. 6 is a schematic block diagram of an audio station attached to the audio I/O bus of a digital signal processor in the distributed processing module in FIG. 3.

An audio station is illustrated in FIG. 6. Each of the stations transfers serial audio data through its associated I/O adapter 28, 30, 32 or 34. The audio data is connected by AES cable and connector 100 to connector 36 at the DPM card (FIG. 3) Digital signal processor 102 operates on the audio data using SRAM 104 for working storage. It processes audio data from microphone 106 or for speaker 108. The audio data processing at DSP 102 is simply traffic management between microphone and speaker. Analog signals from microphone 106 are converted to digital audio data by A/D converter 110. Conversely, the digital audio data for speaker 108 is converted to an analog audio signal by D/A converter 112. Four of these audio stations are connected to each audio DSP in FIG.3.

It will be appreciated by one skilled in the art that many variations may be made in the preferred embodiment. More audio DSPs may be placed in the DPM shown as FIG. 3. Also, not all DSPs in a DPM need to be connected to audio stations. DSPs might be used in a DPM just to add processing power to the distributed processing mixing network. Further, more audio stations may be added by increasing the TDM frame from 256 time slots to any number of slots. The ratio of stations per DSP, DSP per DPM and the number of DPMs are all selectable. The TDM frame, the time slots for audio RAM access by DSPs, the address mapping by map ram 62 are all adjustable to accommodate any size or configuration mixing network.

While a number of preferred embodiments of the invention have been shown and described, it will be appreciated by one skilled in the art, that a number of further variations or modifications may be made without departing from the spirit and scope of our invention.

What is claimed is:

1. Apparatus for distributing the processing of digital audio data in a multiplexed network having a plurality of audio stations to be connected for mixing, said apparatus comprising:
    a multiplex bus means for carrying all of the digital audio data from the audio stations in the network in a multiplex manner;
    a plurality of module means distributed on said bus means for distributed processing of audio data as the data is input to the network from a first audio station, is output from the network to a second audio station and is mixed with audio data from any of the other audio stations in proportion to a selected gain associated with the other station; and
    a plurality of processing means in each of said module means for performing the distributed processing, each of said processing means for input/output processing audio data for one or more audio stations connected to said processing means; and
    each of said processing means for mixing the audio data from one or more of the audio stations in proportion to their selected gain for mixed audio output to said second station to provide mixed audio output data back to said multiplex bus means whereby the processing of audio data from input through mixing to output for any or all of the audio stations may be distributed to a plurality of said processing means.

2. The apparatus of claim 1 wherein said module means comprises:
    storage means intermediate between said plurality of processing means and said multiplex bus means for storing data being transferred between each of said processing means and said multiplex bus means;
    transfer means for transferring digital audio data between said storage means and said multiplex bus means and simultaneously transferring digital audio data between said storage means and said processing means; and
    said plurality of processing means in said module means having an addressing means responsive to each processing means for addressing audio data in said transfer means from one or more audio stations.

3. The apparatus of claim 2 wherein:
    said processing means responsive to input audio data from its associated audio station for gating and equalizing the input audio data and transferring the input processed audio data to said transfer means;
    said processing means responsive to input processed data or mixed audio data in said transfer means for mixing audio data from audio stations and for transferring the mixed audio data to said storage means; and
    said processing means responsive to mixed audio data in said transfer means for equalizing the mixed audio data for output to its associated audio station.

4. The apparatus of claim 1 and in addition:
    means for setting control information in each of said module means, said control information establishing the distributed processing to be performed by each module.

5. The apparatus of claim 4 wherein said setting means comprises:
    a control bus means for carrying control information to each of said module means; and
    a control processing means connected to said control bus means for providing on said control bus means the control parameters for each processing means in said module means.

6. Method for distributing the processing of digital audio data in a mixing network having a plurality of audio data processing modules, each module having a plurality of audio stations connected to the module, said method comprising the steps of:
    transferring all of the digital audio data from the audio stations between modules in the network in a multiplex manner;
    distributed processing of the audio data among the modules as the data is input to network, is output from the network and is mixed with audio data from other audio stations connected to the network through the modules; and said distributed processing performed by a plurality of processing steps at each module, said processing steps for input/output processing audio data for one or more audio stations connected to the module; and said processing steps, when not input/output processing audio data, for mixing the audio data from one or more of the audio stations connected to the network and returning mixed audio data back to said multiplex transferring step whereby the processing of audio data from input through mixing to output may be distributed by said transferring step to a plurality of the modules.

7. The method of claim 6 wherein:

said processing step is responsive to input audio data from an audio station for gating and equalizing the input audio data to prepare the audio data for said transferring step;

said processing step is responsive to input processed data or mixed audio data passed by said transferring step from another module for mixing audio data from audio stations and for preparing the mixed audio data for transfer by said transferring step; and said processing step is responsive to mixed audio data from said transferring step for equalizing the mixed audio data for output to an audio station.

8. The method of claim 7 and in addition:

setting control information in each of said processing steps, said control information establishing the distributed processing to be performed during each step.

9. The apparatus of claim 8 wherein said setting means comprises:

a control processing step for providing control parameters to each processing step.

10. Apparatus for distributing the processing of digital audio data in a mixing network having a plurality of audio stations to be connected for mixing, said apparatus comprising:

an audio bus means for carrying the digital audio data;

a number M of module means connected to said bus means where M is an integer greater than one, each of said module means for distributed digital processing of audio data as the data is input to the network from a first audio station, is output from the network to a second audio station and is mixed with audio data from other audio stations; and a multiplex means in each of said module means for multiplexing the digital audio data between the audio bus means and the module means, said audio data is from all of the audio stations;

a number N of digital processing means in each of said module means where N is an integer greater than one, each of said processing means having input means, output means and mixing means;

said input means in each module means for input processing audio data to said multiplex means from audio stations connected to said processing means;

said output means in each module means for output processing audio data from said multiplex means to audio stations connected to said processing means; and said mixing means in each module means for mixing the audio data from said multiplexing means, the audio data being from any one of the audio stations connected to the network, said mixing means returning the mixed audio data to said multiplex means for further processing by mixing means or output means in the same or another module means whereby the processing of audio data from input through mixing to output may be distributed along the audio bus to M times N digital processing means.

11. The apparatus of claim 10 wherein said input means is responsive to input audio data from an audio station for gating and equalizing the input audio data and transferring the input processed audio data to said multiplex means.

12. The apparatus of claim 11 wherein said mixing means is responsive to input processed audio data or mixed audio data from said multiplex means for mixing audio data from audio stations and for transferring the mixed audio data to said multiplex means.

13. The apparatus of claim 12 wherein said output means is responsive to mixed audio data from said multiplex means for equalizing the mixed audio data for outputting the mixed audio data to an audio station.

14. The apparatus of claim 10 wherein said multiplex means comprises:

storage means intermediate between said N processing means and said audio bus means for storing data being transferred between each of said processing means and said audio bus means;

transfer means for transferring digital audio data between said storage means and said audio bus means and transferring digital audio data between said storage means and said N processing means; and said plurality of processing means in said module means having an addressing means responsive to each processing means for addressing audio data in said storage means from one or more audio stations.

15. The apparatus of claim 14 and in addition:

said storage means is split into a first storage means and a second storage means; and said transfer means in a first time interval is transferring digital audio data between said first storage means and said audio bus means and is transferring digital audio data between said second storage means and said N processing means in the module; and said transfer means in a second time interval alternating with said first interval is transferring digital audio data between said second storage means and said audio bus means and is transferring digital audio data between said first storage means and said N processing means in the module.

16. The apparatus of claim 15 and in addition:

said input means is responsive to input audio data from an audio station for gating and equalizing the input audio data and transferring the input processed audio data to said first or second storage means;

said mixing means is responsive to input processed audio data or mixed audio data from said first or second storage means for mixing audio data from audio stations and for returning the mixed audio data to said first or second storage means; and said output means is responsive to mixed audio data from said first or second storage means for equalizing the mixed audio data for outputting the mixed audio data to an audio station.

17. The apparatus of claim 16 and in addition:

each of said N processing means has access to said first or second storage means in a portion of the first or second time interval less than 1/N of the interval;

working storage means for each of said N processing means for storing audio data being input processed, output processed or mixed processed;

each of said N processing means processing audio data at any time during the first or second interval and transferring processed data to said first or second storage means during the 1/N, or less, portion of the interval that each of said N processing means has access to said first or second storage means.

* * * * *